United States Patent [19]
Roberts et al.

[11] 3,826,040
[45] July 30, 1974

[54] PLANT STEM PROTECTOR

[76] Inventors: Joseph Normand Roberts, both of 404 Mountain Rd., North Wilbraham, 01067; Walter Lovell, both of North Wilbraham, Mass.

[22] Filed: Oct. 10, 1972

[21] Appl. No.: 296,080

[52] U.S. Cl.............................. 47/30, 47/25, 16/2
[51] Int. Cl...................... A01g 13/00, A01g 17/12
[58] Field of Search........... 47/25, 32, 30, 23, 3, 26, 47/28, 15, 29, 41, 41.1, 41.12, 41.13, 41.5; 285/419, 423; 141/337, 392; 16/2

[56] References Cited
UNITED STATES PATENTS

| | | | |
|---|---|---|---|
| 203,898 | 5/1878 | Doak | 47/23 |
| 1,299,870 | 4/1919 | Stevenson | 47/30 |
| 1,829,512 | 10/1931 | Frederickson | 16/2 X |
| 2,258,745 | 10/1941 | Dewey et al. | 285/423 X |
| 2,491,124 | 12/1949 | Martin | 47/38.1 X |
| 3,153,301 | 10/1964 | Redyke | 47/34 |

Primary Examiner—Robert E. Pulfrey
Assistant Examiner—Steven A. Bratlie
Attorney, Agent, or Firm—Charles R. Fay

[57] ABSTRACT

A plant stem protector comprising a one-piece generally tubular member made of self-sustaining but deformable plastic in the general form of a cylinder slit from end to end thereof, said cylinder having open ends with an outstanding flange at one end and at the opposite end it is cut into a concave arcuate conformation providing relatively sharp points adjacent to the slit. These points form entry end edges that overlap each other slightly.

1 Claim, 5 Drawing Figures

3,826,040

PLANT STEM PROTECTOR

BACKGROUND OF THE INVENTION

Plant protectors are old and well known, and are often made of tar paper or similar material bent into a collar. Cut worms especially are very destructive to young and tender plants and it is often necessary to physically protect the same through the use of poisonous solutions or to wrap pieces or strips of paper or other material about the stems. In some cases sheet metal strips are utilized which can be bent around the stems completely enclosing the same. Any material used should be stiff enough to allow the protector to be forced down endwise into the soil after being applied around the stem of the plant and the edges of the material must be overlapped or secured together but this is difficult with paper. Examples of devices of this nature are found in U.S. Pat. Nos. 1,299,870; 1,324,688; and 1,548,682. Whereas devices shown in these patents are satisfactory in many respects they are in some cases awkward to handle and apply and are unreasonably expensive for the purpose; and it is the general purpose of the present invention to provide a very simple and inexpensive plastic plant guard that is very easy and quick to use.

SUMMARY OF THE INVENTION

This invention provides a sheet of plastic formed into the general shape of a cylinder, or injection molded in tubular form, and in either case the device has mating or overlapping edges defining a longitudinal slit, the device being flexible but self-sustaining, e.g., stiff enough to enable it to be pushed down into the soil after having been placed about the stem or stalk of the plant.

The plastic tubular device is open at both ends and has at the top end an outstanding flange by which to push it into the ground, and at the opposite, i.e., the lower end of the device, the edges are cut along arcs of circles to provide sharp points at the end of the slit, the general effect of which is to cause the edge portions of the device to overlap to a greater extent automatically as the same is pushed into the dirt to more closely embrace the stem and to insure that insects and worms cannot enter the device through the slit.

PREFERRED EMBODIMENT OF THE INVENTION

Figure 1:
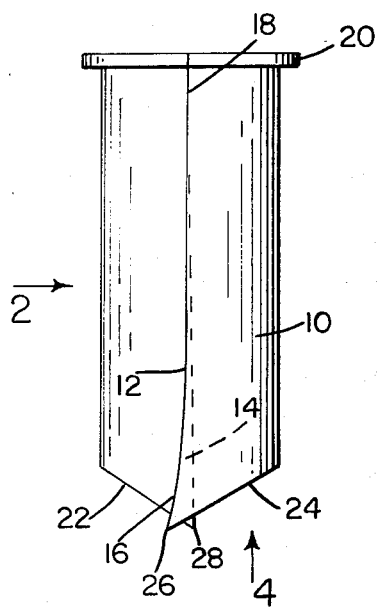
FIG. 1 is a view in front elevation showing the invention.

The present guard device is made of an inexpensive plastic which is deformable but generally self-sustaining. It can either be molded in the shape shown or it can be cut out flat and rolled up to form a cylinder. It comprises a sheet of plastic material 10 rolled over on itself so that the side edges thereof slightly overlap as at 12 and 14, or at least mate.

This forms a generally closed cylindrical member having the edges 12 and 14 overlapping, this member having open ends. It is preferred that the edge 14 overlaps the edge 12 slightly more at the lower edge 16 than at the upper edge at 18.

Figure 2:
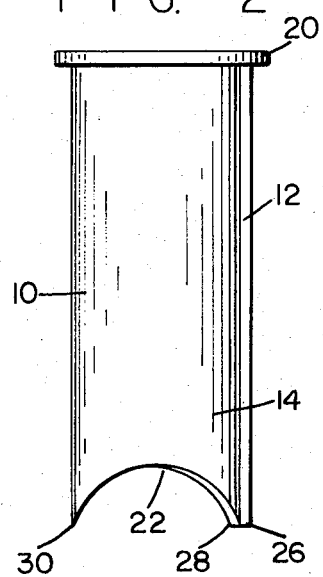
FIG. 2 is a view in side elevation thereof looking in the direction of arrow 2 in FIG. 1.
Figure 3:
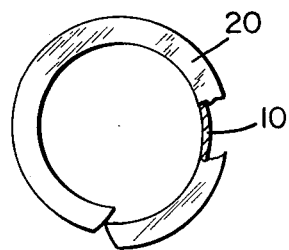
FIG. 3 is a top view part being broken away and in section.
Figure 4:
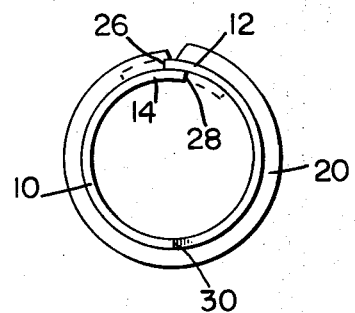
FIG. 4 is a bottom plan view looking in the direction of arrow 4 in FIG. 1.

At the upper open end of the device there is an outstanding flange 20, this flange being flat and annular and at the opposite or lower end of the device the same is cut out on arcs of circles as indicated at 22 and 24. This construction provides relatively sharp points at the lower edges of the overlapping edges 12 and 14, as indicated at 26 and 28 respectively. This action also leaves a relatively sharp point 30 diametrically opposite from the slit 12 as clearly shown in FIGS. 2 and 4.

Figure 5:
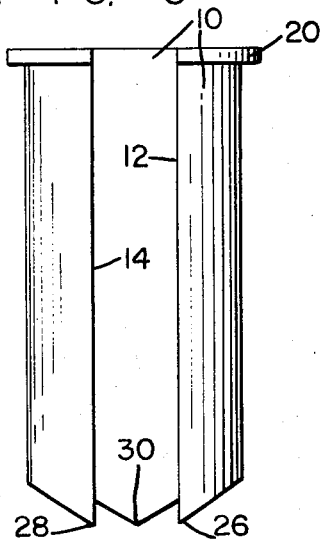
FIG. 5 is a view similar to FIG. 1 but showing the protector open.

In the use of the device the edges 14 and 12 are spread apart as shown in FIG. 5 and the device is then easily applied to the stem or stalk of the plant desired to be protected. Upon releasing these portions of the device the same automatically return to the FIG. 1 position due to the original formation of the plastic material into the shape shown in FIGS. 1 and 2. The fingers may now easily push the device into the ground, with the sharp points 26, 28, and 30 leading, by pressing down on the flange 20. When this is done the tendency is for the edges that overlap, see FIG. 1, to move to a greater degree of overlap, due to the resistance of the earth on the edges at 16, 22.

It will therefore be seen that a very simple and inexpensive plant stem protector is provided. It is easily applied where desired, and there is no possibility for insects or worms to enter the cylinder past edges 12 and 14 all the way from the top to the bottom of the device. The plastic is not degradable and these protectors can be used over and over.

We claim:

1. A plant stem protector comprising a one-piece plastic yielding but self-sustaining member in the form of a cylinder having a longitudinal slit providing separable edges for opening the device in a general direction at right angles to its axis for placing the member about a plant stem, the plastic material tending to return to its original shape upon release thereof, said edges originally being slightly overlapped, the cylinder being open at both ends and having a ground entry end and an opposite end, wherein the ground entry end edges are inclined toward each other relative to the axis of the cylinder forming sharp points, the latter being overlapped to a greater degree than the remainder of the separable edges, so that when the protector is entered into the ground the resistance of the earth on said entry end edges tends to cause the edge portions of the entry end of the device to become overlapped to a greater degree.

* * * * *